United States Patent [19]

Ezzet

[11] Patent Number: 5,768,547
[45] Date of Patent: Jun. 16, 1998

[54] MULTIPLE SEGMENTING OF MAIN MEMORY TO STREAMLINE DATA PATHS IN A COMPUTING SYSTEM

[75] Inventor: Ali Ezzet, Sunnyvale, Calif.

[73] Assignee: Hewlett-Packard Company, Palo Alto, Calif.

[21] Appl. No.: 839,205

[22] Filed: Apr. 23, 1997

Related U.S. Application Data

[62] Division of Ser. No. 480,429, Jun. 6, 1995, Pat. No. 5,664,152.

[51] Int. Cl.$^6$ ............................................. G06F 13/00
[52] U.S. Cl. .................................... 395/309; 711/153
[58] Field of Search ................................ 395/306, 308, 395/309, 821, 842, 872, 287; 711/129, 130, 148, 153, 167, 173

[56] References Cited

U.S. PATENT DOCUMENTS

| | | | |
|---|---|---|---|
| 4,646,237 | 2/1987 | Allen | 395/287 |
| 4,700,292 | 10/1987 | Campanini | 395/200.41 |
| 4,764,896 | 8/1988 | Freimark et al. | 395/823 |
| 4,855,902 | 8/1989 | Kozlik et al. | 395/281 |
| 5,269,005 | 12/1993 | Heil et al. | 395/869 |
| 5,274,795 | 12/1993 | Vachon | 395/500 |
| 5,287,485 | 2/1994 | Umina et al. | 711/120 |
| 5,355,452 | 10/1994 | Lam et al. | 395/308 |
| 5,367,701 | 11/1994 | Von Gnechten et al. | 395/800 |
| 5,379,384 | 1/1995 | Solomon | 395/308 |
| 5,416,907 | 5/1995 | Polzin et al. | 395/886 |
| 5,483,642 | 1/1996 | Okazawa et al. | 395/306 |
| 5,548,730 | 8/1996 | Young et al. | 395/280 |
| 5,584,004 | 12/1996 | Aimoto et al. | 711/5 |
| 5,603,051 | 2/1997 | Ezzet | 395/822 |
| 5,664,152 | 9/1997 | Ezzet | 711/153 |
| 5,673,399 | 9/1997 | Guthrie et al. | 395/308 |
| 5,680,556 | 10/1997 | Begun et al. | 395/311 |

OTHER PUBLICATIONS

Hamacher, V. Carl et al., Computer Organization, Chapter 6, Input–Output Organization, pp. 209–262, McGraw–Hill, 1990.

*Primary Examiner*—Tod R. Swann
*Assistant Examiner*—Conley B. King, Jr.

[57] ABSTRACT

Within a computing system, the main memory is segmented in order to streamline data paths for data transactions between input/output devices. The computing system includes both a host bus and an input/output bus. One or more processors are connected to the host bus. A bus bridge connects the input/output bus to the host bus. The bus bridge is used for transferring information between the host bus and the input/output bus. The main memory for the computing system is segmented as follows. A first main memory segment is connected to the host bus. A second main memory segment is connected to the input/output bus. The first main memory segment and the second main memory segment are configured to appear to the processors as a single logical memory image. The segmented main memory is used to streamline data paths for the computing system. For example, a data transfer between a first input/output device and a second input/output device is controlled by the processor; however, during the first data transfer, the data itself is temporarily stored in the second main memory segment. This allows the data transfer to occur with only control information flowing through the bus bridge. The actual data is transported only on the input/output bus between the second main memory segment and the first input/output device, and between the second main memory segment and the second input/output device.

20 Claims, 8 Drawing Sheets

MULTIPLE SEGMENTING OF MAIN MEMORY TO STREAMLINE DATA PATHS IN A COMPUTING SYSTEM

CROSS REFERENCE TO RELATED APPLICATION

This is a divisional of application Ser. No. 08/480,429 filed on Jun. 6, 1995 now U.S. Pat. No. 5,664,152.

The present invention concerns a computing system with an input/output bus and more particularly concerns multiple segmenting of main memory to streamline data paths in the computing system.

In computing systems which function as network servers, it is increasingly common to utilize multiple central processing units (CPUs) interconnected by a host (processor/memory) bus. In such a system a main memory for the system is also connected to the host bus. Communication with I/O devices is generally through an I/O bus connected to the host bus through a bus bridge.

Operation of a bus bridge for input/output in a multiprocessor system utilizes a significant amount of the host bus bandwidth. In addition to the bandwidth required for data transfers over the host bus, the bus bridge needs to implement all the features of both the host bus and the I/O bus.

For example when a bus bridge accesses the main memory in a system where one or more processors utilizes a cache, it is necessary to take steps to insure the integrity of data accessed in memory. For example, when the bus bridge accesses (writes or reads) data from main memory, it is important to determine whether an updated version of the data resides in the cache of a processor on the system. If an updated version of the data exists, something must be done to insure that the bus bridge accesses the updated version of the data. An operation that assures that the updated version of the data is utilized in a memory reference is referred to herein as a cache coherence operation. Various schemes are used to insure coherence of data accessed by a bus bridge from the system memory. For example, in some systems caches are flushed prior to performing I/O operations.

Likewise, some I/O buses require that data transactions be atomic. That is, other transactions need to be "locked out" during atomic data transactions. A bus bridge which interfaces with such an I/O bus needs to be able to implement this feature. However, when a bus bridge performs atomic transactions, this slows down overall system performance.

When there are multiple processors in a system competing with the bus bridge for access to memory over the host bus, this can slow the access of the bus bridge to main memory and thus cause a significant bottleneck in performance in system I/O.

SUMMARY OF THE INVENTION

In accordance with the preferred embodiment of the present invention, a computing system is presented in which main memory is segmented in order to streamline data paths for data transactions between input/output devices. The invention is utilized in a computing system which includes both a host bus and an input/output bus. One or more processors are connected to the host bus. A bus bridge connects the input/output bus to the host bus. The bus bridge is used for transferring information between the host bus and the input/output bus. The main memory for the computing system is segmented as follows. A first main memory segment is connected to the host bus. A second main memory segment is connected to the input/output bus. The first main memory segment and the second main memory segment are configured to appear to the processors as a single logical memory image. What this means is that both the first main memory segment and the second main memory segment are addressed and managed by operating system software as if they are both part of main memory. From the point of view of the operating system software, the only difference between the first main memory segment and the second main memory segment is the range of addresses assigned to each.

The segmented main memory is used to streamline data paths for the computing system. For example, a data transfer between a first input/output device and a second input/output device is controlled by the processor; however, during the first data transfer, the data itself is temporarily stored in the second main memory segment. This allows the data transfer to occur with only control information flowing through the bus bridge. The actual data is transported only on the input/output bus between the second main memory segment and the first input/output device, and between the second main memory segment and the second input/output device.

The present invention may also be utilized when there are multiple input/output buses. For example, the computing system described above may include a second input/output bus and a second bus bridge connected between the second input/output bus and the host bus. The second bus bridge is used for transferring information between the host bus and the second input/output bus. In this case, the main memory includes a third main memory segment which is connected to the second input/output bus. The first main memory segment, the second main memory segment and the third main memory segment are configured to appear to the processor as a single logical memory image.

The additional segment of main memory is also used to streamline data paths for the computing system. For example, a data transfer between a third input/output device and a fourth input/output device is controlled by the processor; however, during the first data transfer, the data itself is temporarily stored in the third main memory segment. This allows the data transfer to occur with only control information flowing through the second bus bridge. The actual data is transported only on the second input/output bus between the third main memory segment and the third input/output device, and between the third main memory segment and the fourth input/output device.

In the preferred embodiment, the general rule is that data is stored in the data memory segment closest to the final destination of the data. Thus, for a third data transfer from the third input/output device to the second input/output device, data which is the subject of the third data transfer is stored in the second main memory segment.

The present invention has several significant advantages. For example, use of the present invention can result in a significant reduction of traffic on the host (processor) bus. This is especially important when the host bus includes bus masters which compete with a main processor for access to the main memory. In a multi-processor environment, the contention is even higher due not only to the incremental traffic from the additional CPUs, but also to cache coherency protocols which tend to force an upper limit on the number of CPUs that can be placed on the host bus without degrading performance.

The present invention also allows for an improvement in concurrence by limiting the amount of traffic that crosses bus boundaries. In a multi-bus architecture, where the buses are capable of concurrent operations, total system throughput can be significantly increased by reducing the amount of data that crosses from one bus to the other—in effect reducing total bus utilization.

The present invention also allows for the temporary storage of data as close as possible to its final destination. From a system point of view, placing data being transferred from one I/O device to another I/O device as close as possible to the final destination of the data reduces cross bus traffic, total latencies and the potential for stalling I/O devices.

Finally, the present invention allows all these advantages to a conventional computing system without modifications to existing operating system software.

DESCRIPTION OF THE PRIOR ART

Figure 1:
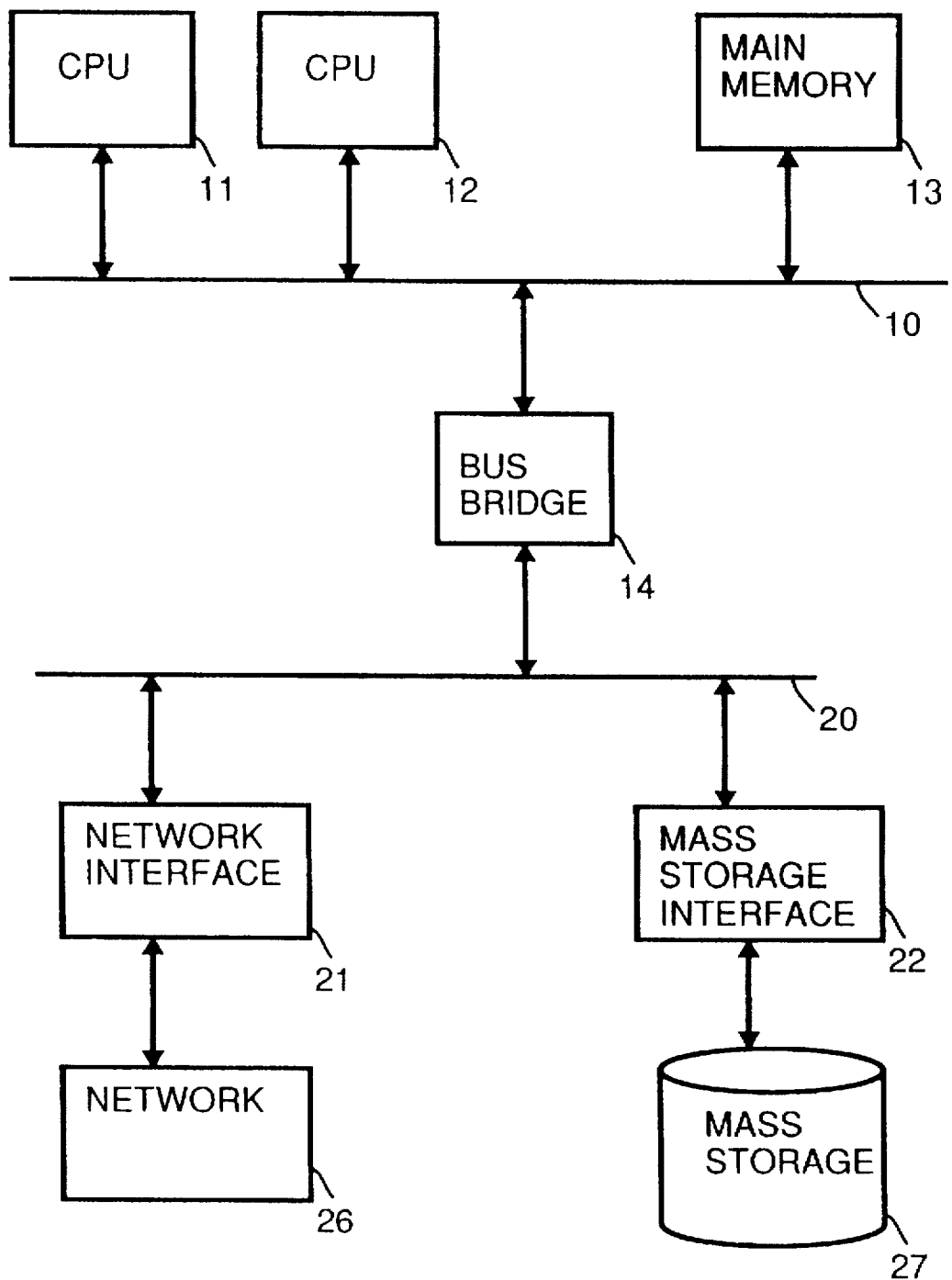
FIG. 1 shows a computing system utilizing a host bus connected through a bus bridge to an I/O bus and connected to a main memory in accordance with the prior art.

FIG. 1 shows a computing system utilizing a host bus 10 connected through a bus bridge 14 to an I/O bus 20. On host bus 10 are connected a central processing unit 11, a central processing unit 12 and a main memory 13. Other processors and/or devices may be also connected to host bus 10, dependent upon system configuration. Various I/O devices are connected to I/O bus 20. For example, a network 26 is connected through network interface 21 to I/O bus 20. Likewise, system mass storage 27 is connected through mass storage interface 22 to I/O bus 20.

For prior art systems, such as that shown in FIG. 1, which function as a network server, a typical data path when data is received from network 26 is to transport the data through network interface 21 through bus bridge 14 to main memory 13. If the ultimate destination of the data is mass storage 27, the data is then transported from main memory 13 through bus bridge 14 through mass storage interface 22 to mass storage 27. In a typical file/print server environment, it is noted that processors 11 and 12 generally do not need to access this data itself. Processors 11 and 12 merely provide control structure that determines where the data comes from and where it goes.

DESCRIPTION OF THE PREFERRED EMBODIMENT

Figure 2:
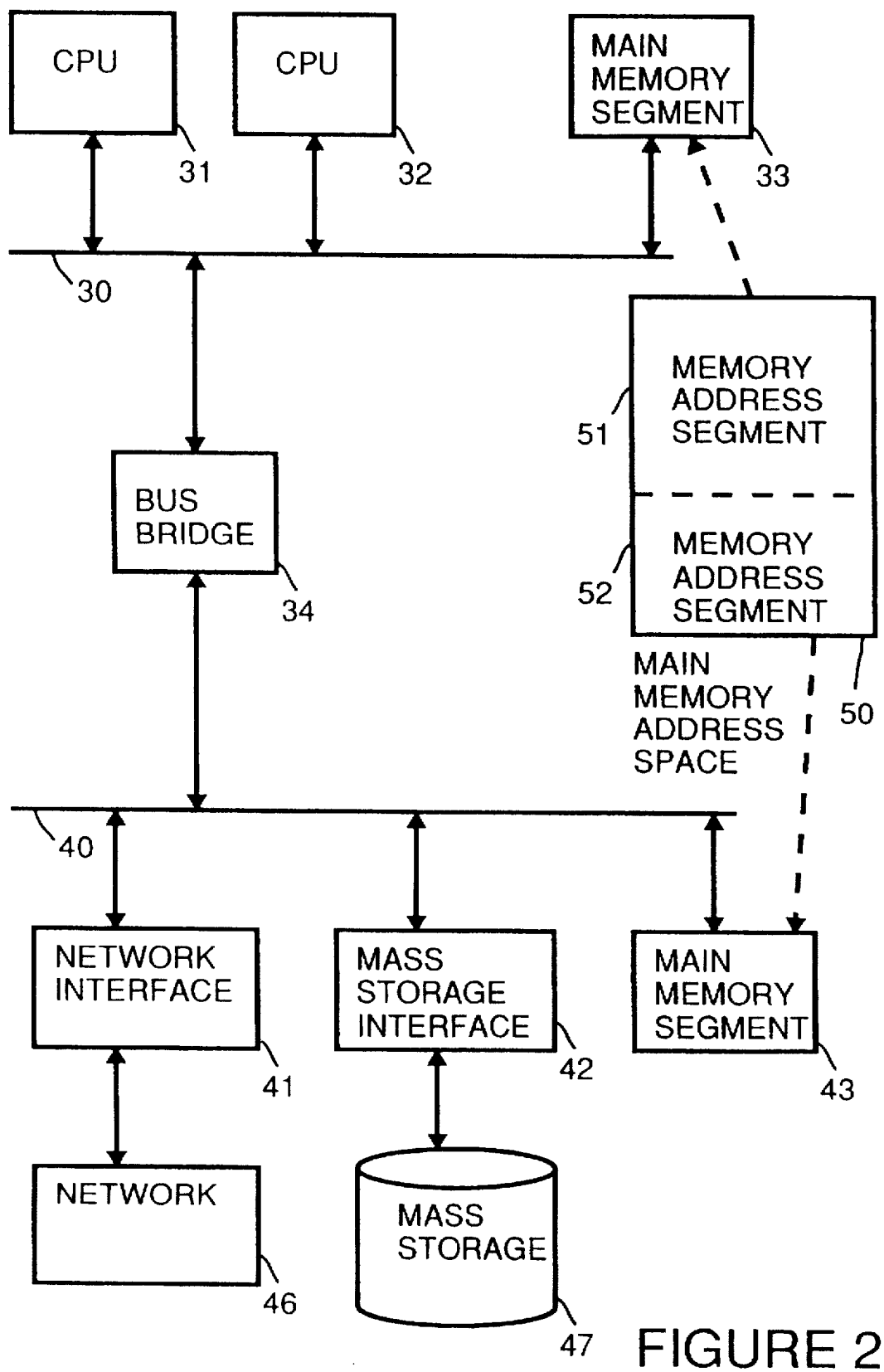
FIG. 2 shows a computing system in which the main memory is segmented so that a portion of the main memory is placed on the host bus and a portion is placed on the I/O bus, in accordance with the preferred embodiment of the present invention.

FIG. 2 shows a computing system utilizing a host bus 30 connected through a bus bridge 34 to an I/O bus 40, in accordance with a preferred embodiment of the present invention. On host bus 30 are connected a central processing unit 31, a central processing unit 32 and a main memory segment 33. Other processors may be also connected to host bus 30, dependent upon system configuration. Various I/O devices are connected to I/O bus 40. For example, a network 46 is connected through network interface 41 to bus 40. Likewise, system mass storage 47 is connected through mass storage interface 42 to I/O bus 40. In addition, a main memory segment 43 is also connected to I/O bus 40.

For example, host bus 30 is sixty-four bits wide and operates in accordance with, for example the XXPRESS bus standard, the P-6 bus standard or some other host bus standard. CPU 31 is, for example, a PENTIUM processor, a P-6 processor, or some other processor. Information on the PENTIUM processor, the P-6 processor and their respective host busses are available from Intel Corporation, having a business address of 2200 Mission College Boulevard, Santa Clara, Calif. 95050.

CPU 32 is, for example, a PENTIUM processor, a P-6 processor, or some other processor. Main memory segment 33 is, for example, implemented using SIMMs and is expandable to 1024 Megabytes.

I/O bus 40, for example, is thirty-two bits wide and operates in accordance with the Peripheral Component Interconnect (PCI) bus standard as described in PCI 2.1 specification. Network 46, for example, operates in accordance with the Ethernet protocol as described in the IEEE 802.3 standard. Mass storage 47 is, for example, implemented using one or more commercially available hard disk drives. Main memory segment 43 is, for example, implemented using SIMMs and is expandable to 256 Megabytes.

Both host bus 30 and I/O bus 40 utilize thirty-two bit addresses. The address space is the same for both host bus 30 and I/O bus 40 and there is no address translation that needs to be performed by bus bridge 30.

In the computing system shown in FIG. 2, a memory address segment 51 of a main memory address space 50 is allocated to main memory segment 33. A memory address segment 52 of main memory address space 50 is allocated to main memory segment 43. It is not a requirement that memory address segment 51 and memory address segment 52 are contiguous, it is only necessary that both are addressed and managed by operating system software as if they are both part of main memory. For example, main memory address segment 51 is allocated addresses from $0_{16}$ to $2FFFFFFF_{16}$. Main memory address segment 52 is allocated addresses from $40000000_{16}$ to $4FFFFFFF_{16}$.

The computer system shown in FIG. 2 operates in accordance with, for example, WINDOWS NT operating system software available from Microsoft Corporation, having a business address at 16011 NE 36th Way, Redmond, Wash. 98073-9717, or NETWARE operating system software available from Novell, Inc., having a business address at 122 East 1700 South, Provo, Utah 94601 or UNIX operating system software. Main memory segment 33 and main memory segment 43, although physically separate, are configured as a single logical memory image, which can be done without modifying the operating system software. Thus the main memory address for data will determine whether data is to be located in main memory segment 33 or main memory segment 43.

The physical splitting of the main memory into two segments allows for the reduction of data traffic on host bus 30 without changes to operating system software. This is demonstrated by FIGS. 3 through 5.

For example, reception of data from network 46 through network interface 41 and placement of the data in mass storage 47 is generally performed in two steps. In the first step, the data is received from network 46 through network interface 41 and placed in the main memory. In the second step, the data is transferred from the main memory through mass storage interface 42 to mass storage 47.

Figure 3:
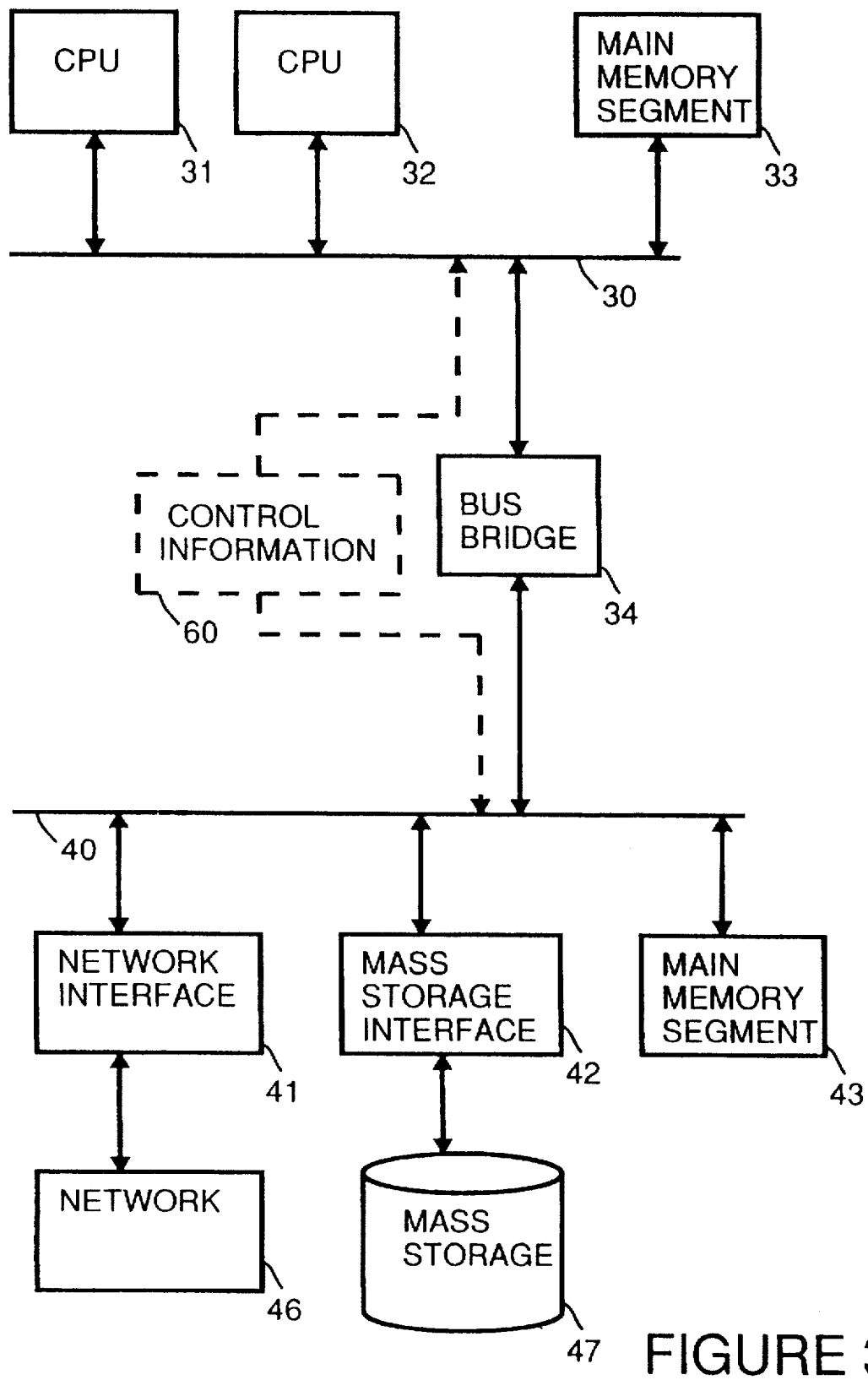
FIG. 3 illustrates flow of control information through the computing system shown in FIG. 2, in accordance with the preferred embodiment of the present invention.

FIG. 3 demonstrates the flow of control information 60 during the set-up for the data transfer. For example, one of CPU 31 or CPU 32 will set up the data transfer. During this data set-up, control information 60, pertaining to the data transfer, will flow across bus bridge 34. However, when setting up the data transfer, the responsible processor will designate addressable memory within main memory segment 43 for temporary storage of data for the data transactions.

Figure 4:
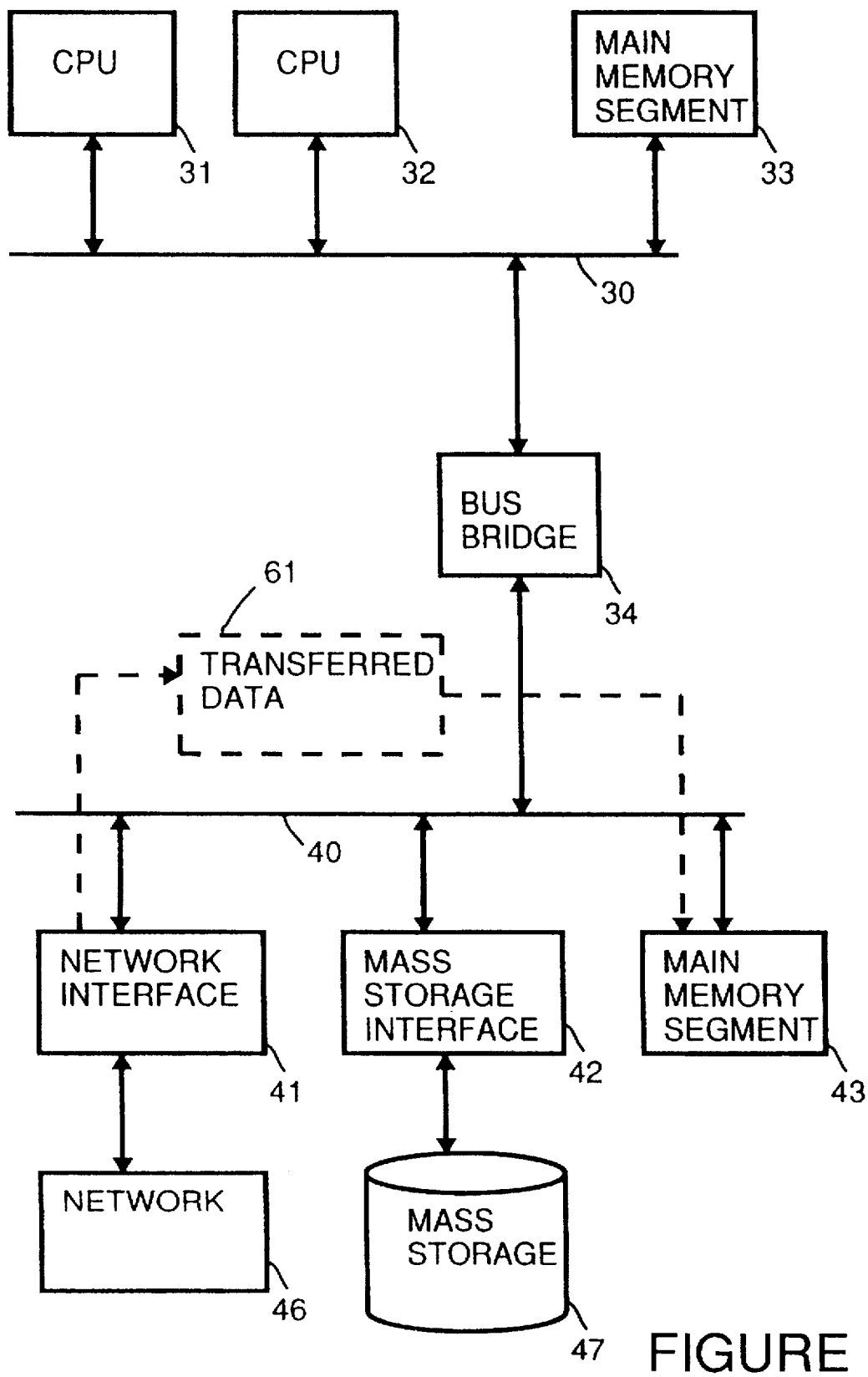
FIG. 4 and FIG. 5 illustrate flow of data through the computing system shown in FIG. 2, in accordance with the preferred embodiment of the present invention.
Figure 5:
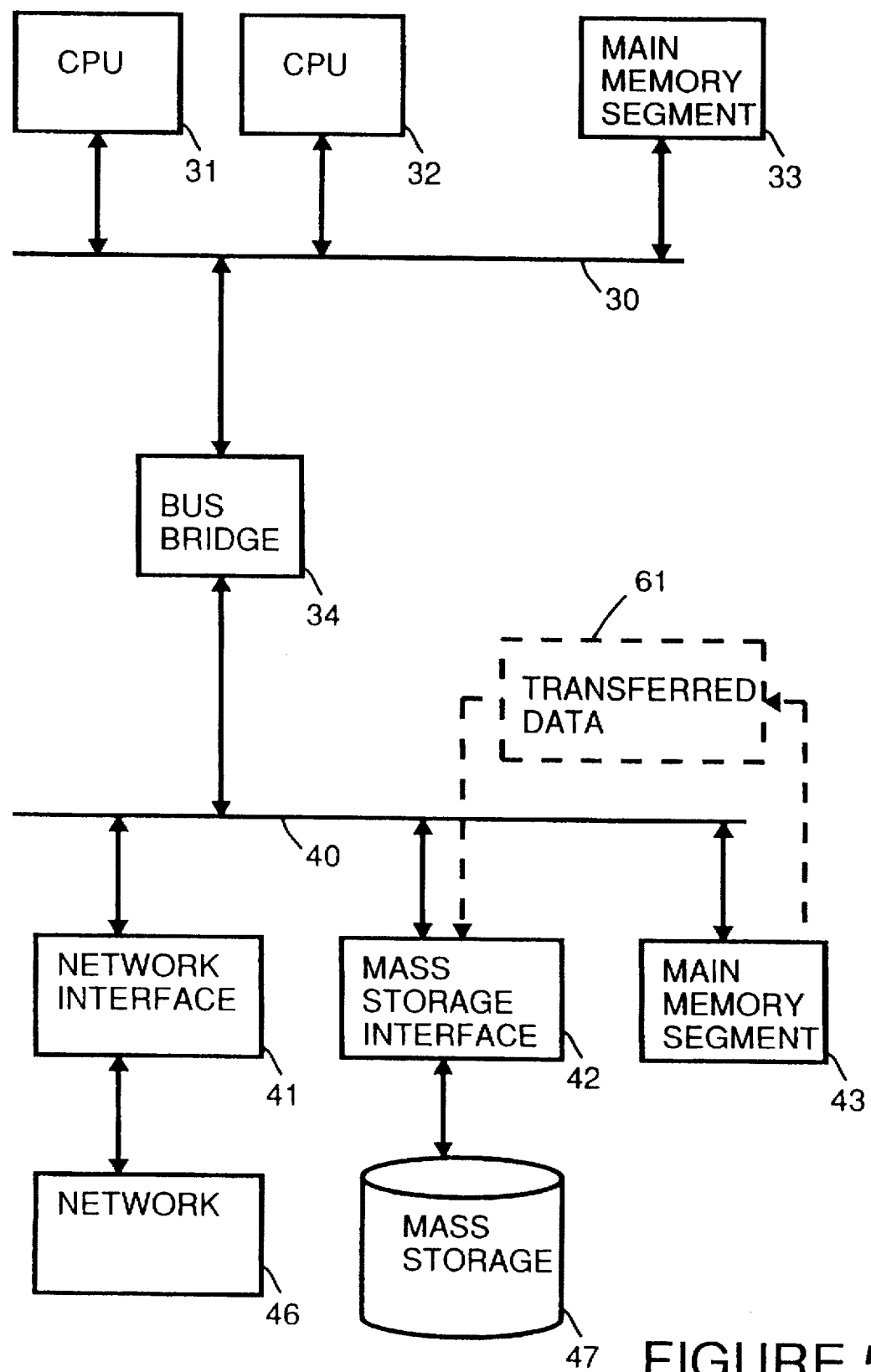

As illustrated by FIG. 4, when transferred data 61 is received from network 46 through network interface 41, transferred data 61 is placed in main memory segment 43. As illustrated by FIG. 5, transferred data 61 is then transferred from main memory segment 43 through mass storage interface 42 to mass storage 47. As is clear, the utilization of main memory segment 43 for this data transfer reduced the traffic across bus bridge 34. Only the control information flowed across bus bridge 34. All the data transfer was performed utilizing only I/O bus 40.

While one great advantage of the present invention is that it allows a significant performance improvement without changes to the operating system software, a greater level of performance improvement can be achieved by modifying code within the operating system so that the operating system is aware of the partitioning of main memory and actively helps in streamlining and shortening data paths.

Figure 6:
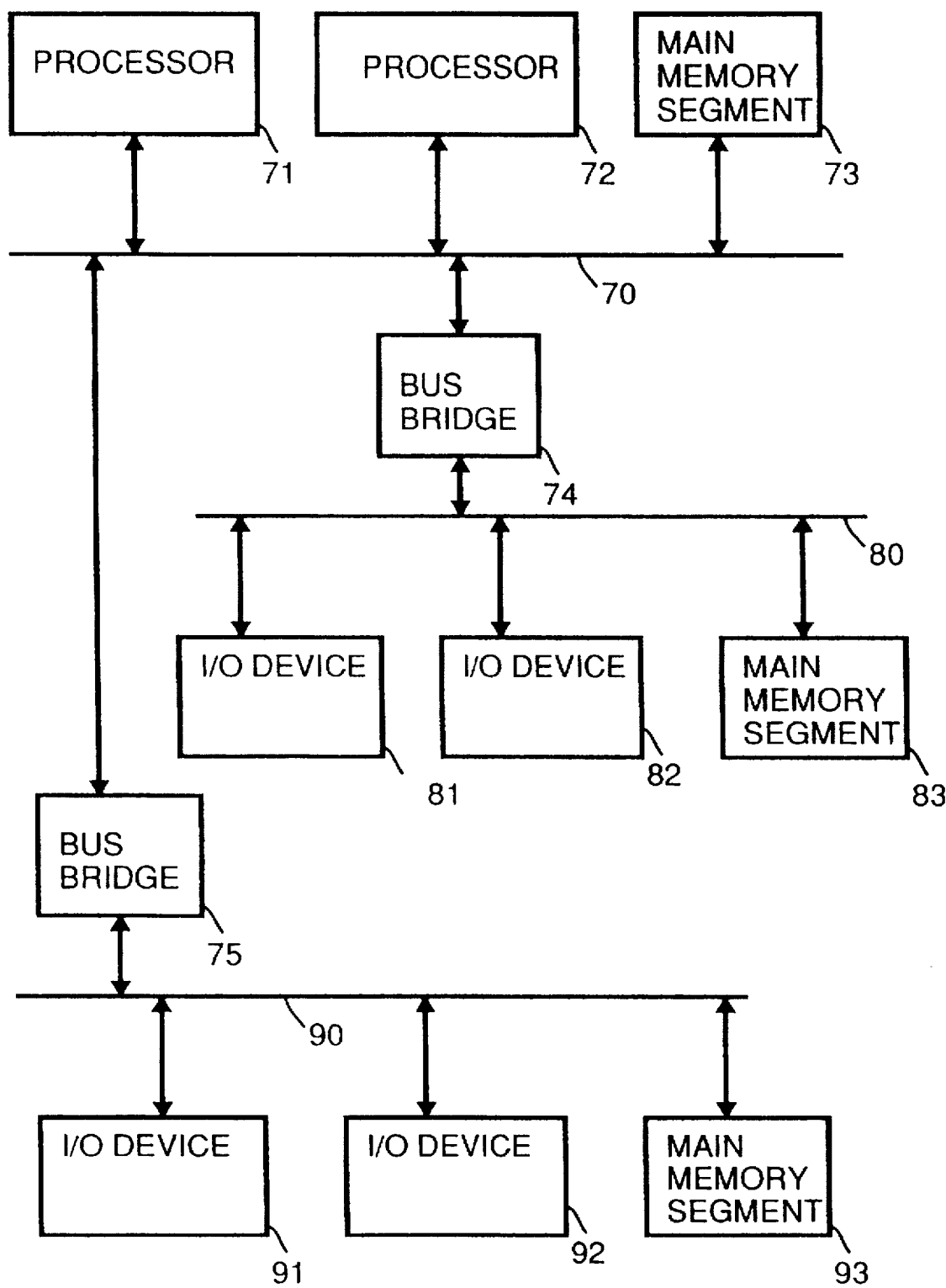
FIG. 6 shows a computing system in which the main memory is segmented so that a portion of the main memory is placed on the host bus, a portion is placed on a first I/O bus and a portion is placed on a second I/O bus, in accordance with an alternate preferred embodiment of the present invention.

Additionally, while the embodiment of FIG. 2 shows the present invention implemented in a system with a single I/O bus, the principles of the present invention extend to many system configurations. For example, FIG. 6 shows a computing system utilizing a host bus 70 connected through a bus bridge 74 to an I/O bus 80 and also connected through a bus bridge 75 to an I/O bus 90. On host bus 70 are connected a processor 71, a processor 72 and a main memory segment 73. Other processors may be also connected to host bus 70, dependent upon system configuration. Various I/O devices are connected to I/O bus 80. For example, an I/O device 81 and an I/O device 82 are connected to I/O bus 80. A main memory segment 83 is also connected to I/O bus 80. Likewise, various I/O devices are connected to I/O bus 90. For example, an I/O device 91 and an I/O device 92 are connected to I/O bus 90. A main memory segment 93 is also connected to I/O bus 90.

As in the computing system shown in FIG. 2, when performing data transfers between I/O devices, the flow of control information travels across bus bridge 74 and bus bridge 75 to processor 71 and/or processor 72. When setting up a data transfer between two I/O devices, the processor arranges for the data to be placed in the memory segment closest to the ultimate destination. Thus, for a data transfer between I/O device 81 and I/O device 82, main memory segment 83 is used. For a data transfer between I/O device 91 and I/O device 92, main memory segment 93 is used. For a data transfer from I/O device 92 to I/O device 82, main memory segment 83 is used. This will reduce cross bus traffic, total latencies on both the host bus and the I/O busses and the potential for stalling I/O devices. In an alternate embodiment, when setting up a data transfer between two I/O devices, the processor arranges for the data to be placed in the memory segment closest to the original source of the information.

Figure 7:
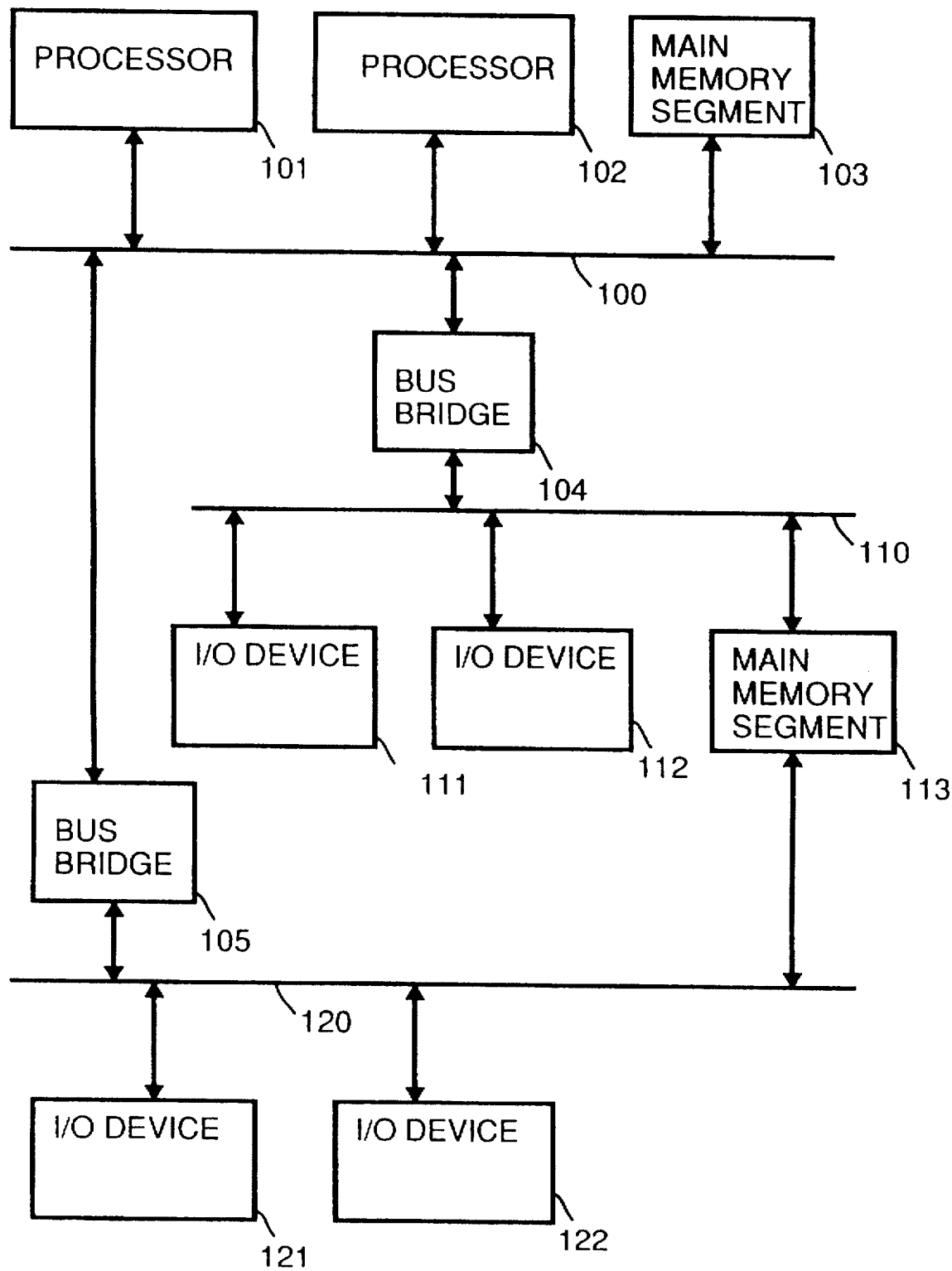
FIG. 7 shows a computing system in which the main memory is segmented so that a portion of the main memory is placed on the host bus, a portion is placed between a first I/O bus a second I/O bus, in accordance with another alternate preferred embodiment of the present invention.

FIG. 7 shows a computing system utilizing a host bus 100 connected through a bus bridge 104 to an I/O bus 110 and also connected through a bus bridge 105 to an I/O bus 120 in another alternate preferred embodiment. On host bus 100 are connected a processor 101, a processor 102 and a main memory segment 103. Other processors may be also connected to host bus 100, dependent upon system configuration. Various I/O devices are connected to I/O bus 110. For example, an I/O device 111 and an I/O device 112 are connected to I/O bus 110. A main memory segment 113 is also connected to I/O bus 110. Likewise, various I/O devices are connected to I/O bus 120. For example, an I/O device 121 and an I/O device 122 are connected to I/O bus 120. Main memory segment 113 is also connected to I/O bus 120.

As in the computing system shown in FIG. 6, when performing data transfers between I/O devices, the flow of control information travels across bus bridge 104 and bus bridge 105 to processor 101 and/or processor 102. When setting up a data transfer between two I/O devices, the processor arranges for the data to be placed in the memory segment closest to the ultimate destination. The architecture in FIG. 7 can be specifically advantageous for data received from a location on one I/O bus and transferred to a location on another I/O bus. Thus, for a data transfer between I/O device 122 to I/O device 112, main memory segment 113 is used so that in is not necessary for data to be transferred over host bus 100. This will reduce cross bus traffic, total latencies on both the host bus and the I/O busses and the potential for stalling I/O devices.

Figure 8:
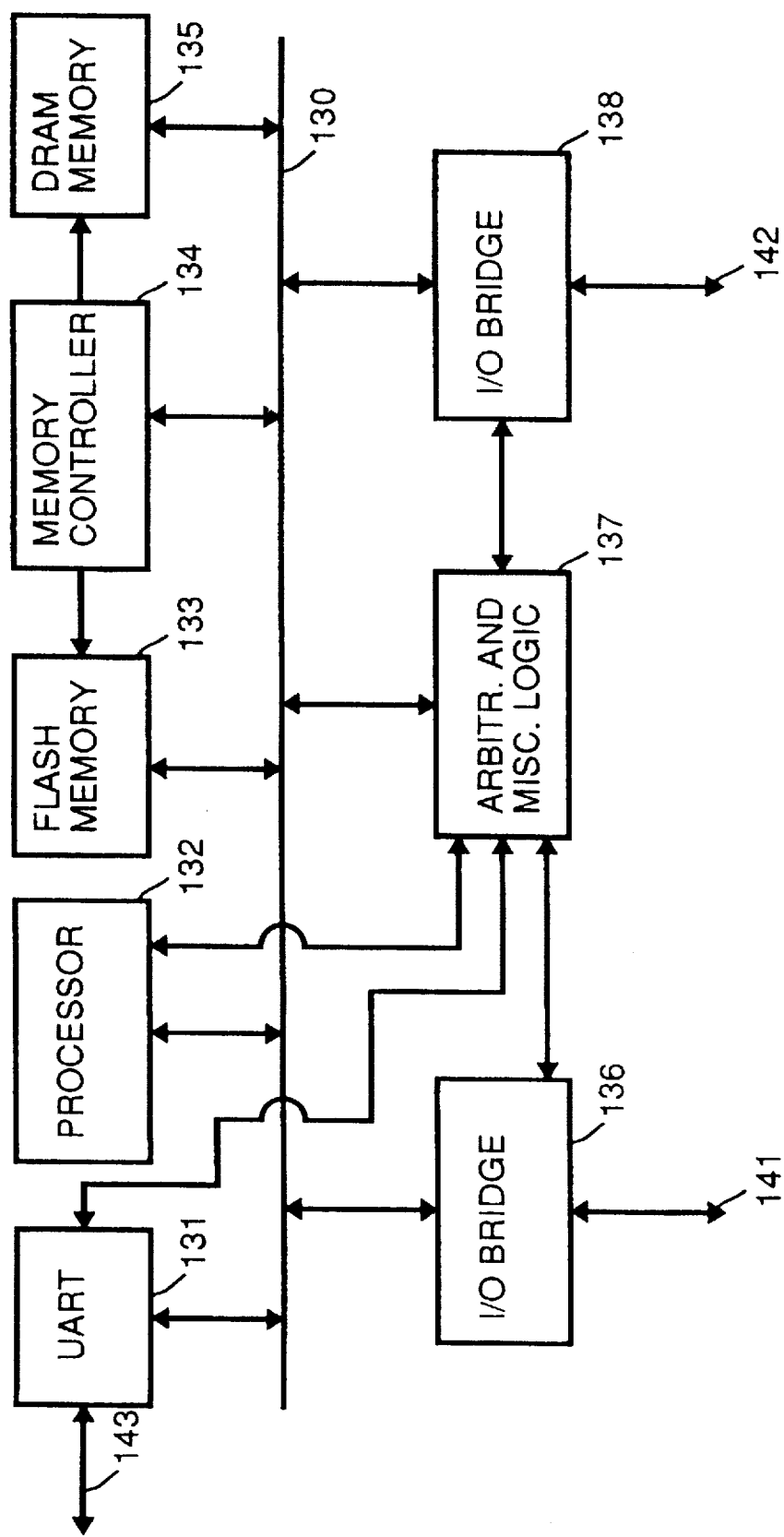
FIG. 8 shows an implementation of a main memory segment in accordance with a preferred embodiment of the present invention.

FIG. 8 is a block diagram of an implementation of how main memory segment 113 may be implemented using an I/O processor. The I/O processor includes a local processor 132, a flash memory 133, a memory controller 134 a dynamic random access memory (DRAM) 135, an I/O bridge 136, an I/O bridge 138, a universal asynchronous receiver-transmitter (UART) 131 and arbitration and miscellaneous logic 137 all connected to a local bus 130, as shown. For example, local processor 132 is an i960 JF processor available from Intel Corporation, having a business address of 2200 Mission College Boulevard, Santa Clara, Calif. 95050. Local bus 130 is 32 bits wide and operates in accordance with i960 bus standard. Flash memory 133 is, for example 256 Kilobytes, and is used to store programming code for processor 132. DRAM memory 135 is, for example 256 Megabytes. A portion of DRAM memory 132 is used by processor 132 as a local memory and a portion of DRAM memory 132 is used as main memory segment 113, as discussed above. A memory controller 134 provides control signals to flash memory 133 and DRAM memory 135. I/O bridge 136 and I/O bridge 138 are implemented using i960/PCI Bridge integrated circuitry available from PLX Technologies, Inc., having a business address of 625 Clyde Avenue, Mountain View, Calif. 94043. Connection from I/O bridge 136 to an I/O bus is represented by lines 141. Connection from I/O bridge 138 to an I/O bus is represented by lines 142. Arbitration and miscellaneous logic arbitrates access to local bus 130. UART 131 provides a serial connection 143 to the I/O processor which is used for testing and service of the I/O processor.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A computing system comprising:

a host bus, the host bus transferring both addresses and data;

a processor, coupled to the host bus;

a first input/output bus, the first input/output bus transferring both addresses and data;

a bus bridge coupled between the first input/output bus and the host bus, the bus bridge being used for transferring information between the host bus and the first input/output bus;

a first input/output device coupled to the first input/output bus; and, a second input/output device coupled to the output bus;

wherein when data is transferred between the first input/output device and the second input/output device the data is not transferred through the bus bridge and wherein the transfer of the data is controlled via control information passed through the bus bridge between the host bus and the first input/output bus.

2. A computing system as in claim 1 additionally comprising:

a main memory for the computing system comprising, a first main memory segment coupled to the host bus, and a second main memory segment coupled to the first input/output bus, wherein the first main memory segment and the second main memory segment are configured to appear to the processor as a single logical memory image.

3. A computing system as in claim 2 wherein a first data transfer between the first input/output device and the second input/output device is controlled by the processor, and during the first data transfer, transferred data is stored in the second main memory segment.

4. A computer system as in claim 1 additionally comprising:

a second input/output bus;

a second bus bridge coupled between the second input/output bus and the host bus, the second bus bridge being used for transferring information between the host bus and the second input/output bus;

a first storage device coupled to the first input/output bus; and, a second storage device, coupled to the second input/output bus.

5. A computing system as in claim 4 additionally comprising:

a third input/output device coupled to the second input/output bus; and a fourth input/output device coupled to the second input/output bus, wherein a second data transfer between the third input/output device and the fourth input/output device is controlled by the processor, and during the second data transfer, transferred data is stored in the second storage device.

6. A computing system as in claim 4 wherein a third data transfer from the third input/output device to the second input/output device is controlled by the processor, and during the third data transfer, transferred data is stored in the first storage device.

7. A computer system as in claim 1 additionally comprising:

a second input/output bus;

a second bus bridge coupled between the second input/output bus and the host bus, the second bus bridge being used for transferring information between the host bus and the second input/output bus; and, a first storage device coupled to the first input/output bus and to the second input/output bus.

8. A computing system as in claim 7 additionally comprising:

a third input/output device coupled to the second input/output bus; and a fourth input/output device coupled to the second input/output bus, wherein a second data transfer between the third input/output device and the fourth input/output device is controlled by the processor, and during the second data transfer, transferred data is stored in the first storage device.

9. A computing system as in claim 8 wherein a third data transfer from the third input/output device to the second input/output device is controlled by the processor, and during the third data transfer, transferred data is stored in the first storage device.

10. A computing system as in claim 1 wherein the first input/output bus operates in accordance to a PCI bus standard.

11. A method for performing a data transfer from a first input/output device connected to a first input/output bus to a second input/output device connected to the first input/output bus, comprising the steps of:

(a) sending control information between the first input/output device and a processor connected to the host bus, the control information passing through a bus bridge connected between the first input/output bus and the host bus;

(b) transferring data from the first input/output device to a storage device, the data not passing through the bus bridge connected between the first input/output bus and the host bus, wherein the storage device is connected to the first input/output bus; and, (c) transferring data from the storage device to the second input/output device, the data not passing through the bus bridge connected between the first input/output bus and the host bus.

12. A method as in claim 11 additionally comprising the following step performed before step (a):

(d) configuring a first main memory segment connected to a host bus and a second main memory segment connected to the first input/output bus to appear to an operating system for the computing system as a single logical memory image, wherein the storage device is the second main memory segment.

13. A method as in claim 11 wherein in step (b) and step (c) the first input/output bus operates in accordance to a PCI bus standard.

14. A method for performing data transfers between input/output devices, comprising the following step:

(a) performing a first data transfer, including the following substeps, (a.1) sending first control information between a first input/output device connected to the first input/ output bus and a processor connected to the host bus, the first control information passing through a first bus bridge connected between the first input/output bus and the host bus, (a.2) transferring data from the first input/output device to a first storage device, the data not passing through the first bus bridge connected between the first input/output bus and the host bus, wherein the first storage device is connected to the first input/output bus, and (a.3) transferring data from the first storage device to a second input/output device connected to the first input/output bus, the data not passing through the first bus bridge connected between the first input/output bus and the host bus.

15. A method as in claim 14 wherein in step (a) the first input/output bus operates in accordance to a PCI bus standard.

16. A method as in claim 14 additionally including the following step:

(b) performing a second data transfer, including the following substeps, (b.1) sending second control information between a third input/output device connected to a second input/output bus and a processor connected to the host bus, the second control information passing through a second bus bridge connected between the second input/output bus and the host bus, (b.2) transferring data from the third input/output device to a second storage device, the data not passing through the second bus bridge connected between the second input/output bus and the host bus, wherein the second storage device is connected to the second input/output bus, and (b.3) transferring data from the second storage device to a fourth input/output device connected to the second input/output bus, the data not passing through the second bus bridge connected between the second input/output bus and the host bus.

17. A method as in claim 14 additionally including the following step:

(b) performing a second data transfer, including the following substeps, (b.1) sending second control information between a third input/output device connected to the second input/output bus and a processor connected to the host bus, the second control information passing through a second bus bridge connected between the second input/output bus and the host bus, (b.2) transferring data from the third input/output device to the first storage device, the data passing through the second bus bridge and through the first bus bridge, and (b.3) transferring data from the first storage device to the first input/output device, without the data passing through the first bus bridge connected between the second input/output bus and the host bus.

18. A method as in claim 14 wherein in step (a) the first storage device is connected to a second input/output bus.

19. A method as in claim 18 additionally including the following step:

(b) performing a second data transfer, including the following substeps, (b.1) sending second control information between a third input/output device connected to the second input/output bus and a processor connected to the host bus, the second control information passing through a second bus bridge connected between the second input/output bus and the host bus, (b.2) transferring data from the third input/output device to the first storage device, the data not passing through the second bus bridge connected between the second input/output bus and the host bus, and (b.3) transferring data from the first storage device to a fourth input/output device connected to the second input/output bus, the data not passing through the second bus bridge connected between the second input/output bus and the host bus.

20. A method as in claim 18 additionally including the following step:

(b) performing a second data transfer, including the following substeps, (b.1) sending second control information between a third input/output device connected to the second input/output bus and a processor connected to the host bus, the second control information passing through a second bus bridge connected between the second input/output bus and the host bus, (b.2) transferring data from the third input/output device to the first storage device, without the data passing through the second bus bridge connected between the second input/output bus and the host bus, and without the data passing through the first bus bridge connected between the first input/output bus and the host bus, and (b.3) transferring data from the first storage device to the first input/output device, without the data passing through the first bus bridge connected between the first input/output bus and the host bus.

* * * * *